Patented Mar. 19, 1935

1,994,931

UNITED STATES PATENT OFFICE 1,994,931

MANUFACTURE OF FLEXIBLE ELECTRICAL INSULATING MATERIAL

David Traill, Saltcoats, Scotland, assignor to Imperial Chemical Industries Limited, a corporation of Great Britain No Drawing. Application April 25, 1932, Serial No. 607,506. In Great Britain April 27, 1931

12 Claims. (Cl. 106—40)

This invention relates to the manufacture of flexible electrical insulating material from cellulose ethers, such as ethyl cellulose or benzyl cellulose, and to products containing the same.

I have found that when cellulose ethers which are insoluble in and do not swell in water are worked up with plasticizers consisting of aromatic polyethers of polyhydric alcohols, with or without suitable fillers, the products exhibit excellent physical and electrical properties and can be used with great advantage for the manufacture of both overhead and underground electric cables. Among the valuable properties of the insulating material obtained according to the invention, may be mentioned non-inflammability, chemical stability (freedom from hydrolysis and resistance to attack by ozone, conferring weathering properties), impermeability to moisture, freedom from ionization, and low power loss, as well as high electrical resistivity. This last property is secured essentially by the choice of the stated plasticizers, which in respect of electrical resistivity, are outstanding among the common plasticizers, as may be seen from the following table of relative electrical resistivities:—

| | |
|---|---|
| Transformer oil | 1.000 |
| Ditolyl ether of glycerol | 1.002 |
| Dibenzyl ether of glycerol | 0.940 |
| Monotolyl ether of glycerol | 0.542 |
| Monobenzyl ether of glycerol | 0.381 |
| Diethyl ether of glycerol | 0.225 |

According to one form of the invention the cellulose ether and plasticizer are mixed, the proportion of the plasticizer being 10–200 per cent of the weight of the cellulose ether, and the mixed material is incorporated on heated rolls or in other suitable apparatus, e. g. a Werner Pfleiderer incorporator, or a Banbury Mill, or other internal mixer. After a short time, the powdered filler, if such is used, e. g. zinc oxide, slate, asbestos, or mixtures thereof, is added and mixing is continued until a homogeneous product is obtained. The proportion of filler added is generally from 60–100 per cent of the cellulose ether, but may be higher or lower according to the flexibility desired in the final product; the maximum amount of filler is about 6 times the weight of the cellulose ether.

The product obtained as above may be formed into sheets or moulded into any required shape for use; it may also be extruded or applied in other known manner around a wire or cable as an insulating sheath. The electrical resistivity of the product is of the same order as that of transformer oil. The product shows good resistance to the various surfacing oils used in cable manufacture.

The invention is not restricted as to manner, time or temperature of mixing within the limits of thermostability of the plastic, and in practice the temperature used is conveniently about 80–170° C.

If desired, dyes may be present and the properties of the material may be modified by the introduction of relatively small quantities of resins and the like, without departing from the invention.

In another form of the invention the flexible insulating plastic is made by incorporating the above ingredients in presence of one or more volatile solvents, or partial solvents, for the cellulose ether, and subsequently evaporating the volatile material, which is hereinafter referred to as volatile solvent, since even a partial solvent for the cellulose ether may form a complete solvent or diluent for the plastic. This method is particularly useful when the plastic is to be used for impregnating or coating textile materials, whether or not already impregnated or coated with other materials, for wrapping around electrical conductors, since in such cases it is convenient to have the plastic in liquid form for ease of application. When forming the plastic in this way care should be taken to avoid the deposition of atmospheric moisture during the evaporation stage. This condition may be simply fulfilled by using a proportion at least of a medium boiling solvent, on the principle well known in the art of coating with cellulose derivative compositions. Thus, if a low boiling solvent such as ethyl acetate, is employed there should also be employed a proportion of one or more higher boiling solvents, such as butyl alcohol, ethyl lactate, xylene or the like. It will be understood that the incorporation of the ingredients is facilitated by the presence of the organic solvent, and, in general, it may be carried out at a lower temperature when a volatile solvent is used than when it is absent. Thus, if the quantity of solvent used is such as to result in a liquid, incorporation can take place at room temperature.

The invention is illustrated, but not limited, by the following examples, in which the parts are by weight:

*Example I*

20 parts of glycerol dibenzyl ether are roughly mixed with 50 parts of benzyl cellulose, approximately a dibenzyl ether of cellulose, and the mixture is added to a rubber mill, the rolls of which are heated by steam at a pressure of 90-100 lbs./sq. in. The material is thermoplastic and forms a somewhat sticky layer on the roll. After 10 minutes mixing, 30 parts of zinc oxide are gradually added and the mixture is milled for a further 10-20 minutes.

*Example II*

18 parts of p-ditolyl ether of glycerol are mixed in a Werner Pfleiderer incorporator with 42 parts of ethyl cellulose. The ethyl cellulose employed is approximately a di-ethyl cellulose which melts about 200° C. The mixture is milled on a two bowl mill heated by steam at a pressure of 100 lbs./sq. in. After 15 minutes milling 40 parts of zinc oxide are added and after a further 30 minutes milling the material is removed from the rolls and cooled.

*Example III*

20 parts of the ditolyl glycerol ether known as dicresylin are incorporated for about 20 minutes with 100 parts of the benzyl cellulose used in Example I, in a rubber mill, the rolls of which are heated by steam at a pressure of 50 lbs./sq. in. The material may then be extruded directly around the conductor or otherwise applied to the same so as to form an insulated cable.

*Example IV*

300 parts of benzyl cellulose and 60 parts of dicresylin are mixed in a Werner Pfleiderer incorporator for about one hour, together with 500 parts of toluol, 300 parts of xylol, 20 parts of industrial spirits and 50 parts of butyl alcohol. If desired 100 parts of zinc oxide may be added. The product is applied in known manner to fabric tapes which are then wrapped around the conductor to form an insulated cable.

As many apparent and widely different embodiments of this invention may be made without departing from the spirit thereof, it is to be understood that I do not limit myself to the foregoing examples or description except as indicated in the following claims.

I claim:

1. A composition adapted for use as flexible insulating material comprising the product formed by mixing 50 parts of benzyl cellulose and 20 parts of glycerol dibenzyl ether.

2. A composition adapted for use as flexible insulating material comprising the product formed by mixing 42 parts of ethyl cellulose and 18 parts of p-di-tolyl ether of glycerol.

3. Flexible insulating material comprising the product formed by mixing dicresylin and benzyl cellulose.

4. A composition adapted for use as flexible insulating material comprising the product formed by mixing 20 parts of dicresylin with 100 parts of benzyl cellulose.

5. The method of preparing flexible insulating material which comprises mixing 20 parts of glycerol dibenzyl ether with 50 parts of benzyl cellulose and heating to a temperature corresponding to approximately 90-100 pounds of steam per square inch.

6. The method of preparing flexible insulating material which comprises mixing 20 parts of dicresylin with 100 parts of benzyl cellulose, incorporating such a mixture between rolls heated to a temperature corresponding to a steam pressure of 50 pounds per sq. in. and extruding the product directly about an article to which it is to be applied.

7. The method of preparing flexible insulating material which comprises mixing 20 parts of glycerol dibenzyl ether with 50 parts of benzyl cellulose and heating to a temperature corresponding to approximately 90-100 pounds of steam per square inch and subsequently gradually adding 30 parts of zinc oxide as a filler.

8. The method of preparing flexible insulating material which comprises mixing 18 parts p-ditolyl ether of glycerol with 42 parts ethyl cellulose at a temperature corresponding to steam pressure of approximately 100 pounds per square inch and subsequently gradually adding 40 parts of zinc oxide as a filler.

9. Flexible insulating material comprising a cellulose ether, and dicresylin as a plasticizer therefor.

10. A method of preparing flexible insulating material which comprises mixing a cellulose ether with a plasticizer selected from the group consisting of glycerol dibenzyl ether and ditolyl glycerol ether, and heating to a temperature of from about 80° to 170° C.

11. A method of preparing flexible insulating material which comprises mixing a cellulose ether with a plasticizer selected from the group consisting of glycerol dibenzyl ether and ditolyl glycerol ether, incorporating a filler therein, and heating to a temperature of from about 80° to 170° C.

12. Flexible insulating material comprising a plastic composition of a cellulose ether and a plasticizer therefor selected from the group consisting of glycerol dibenzyl ether and ditolyl glycerol ether.

DAVID TRAILL.